May 27, 1952  P. M. McKENNA ET AL  2,598,581
CUTTING TOOL
Filed Sept. 4, 1948  2 SHEETS—SHEET 1
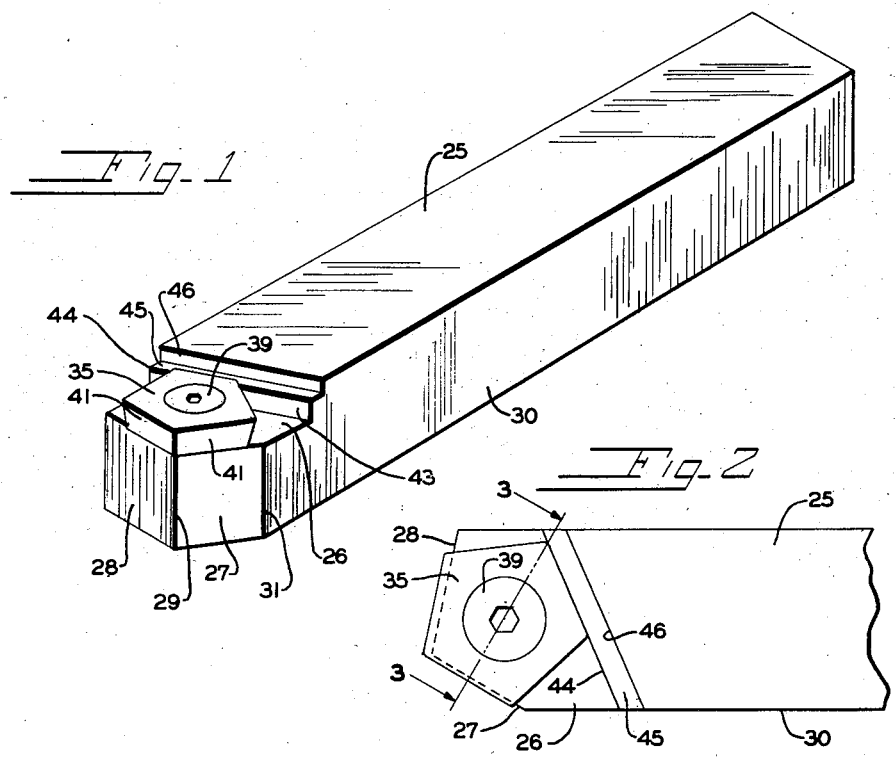
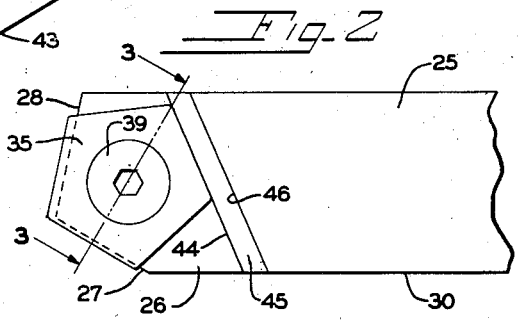
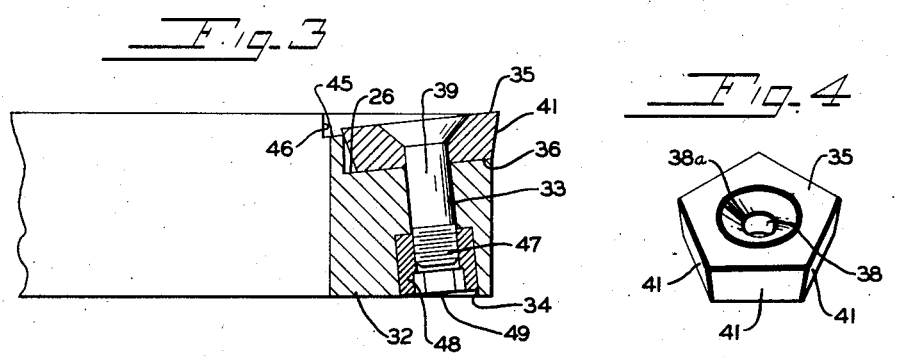
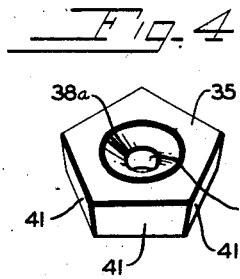
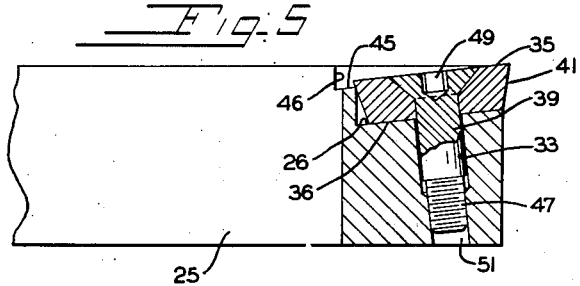
INVENTOR.
PHILIP M. McKENNA
WILBUR L. KENNICOTT
BY
Clarence B. DesJardins
THEIR ATTORNEY May 27, 1952     P. M. McKENNA ET AL     2,598,581
CUTTING TOOL
Filed Sept. 4, 1948                      2 SHEETS—SHEET 2
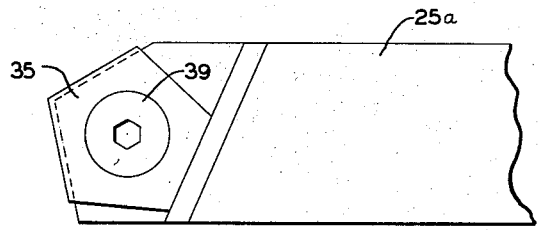
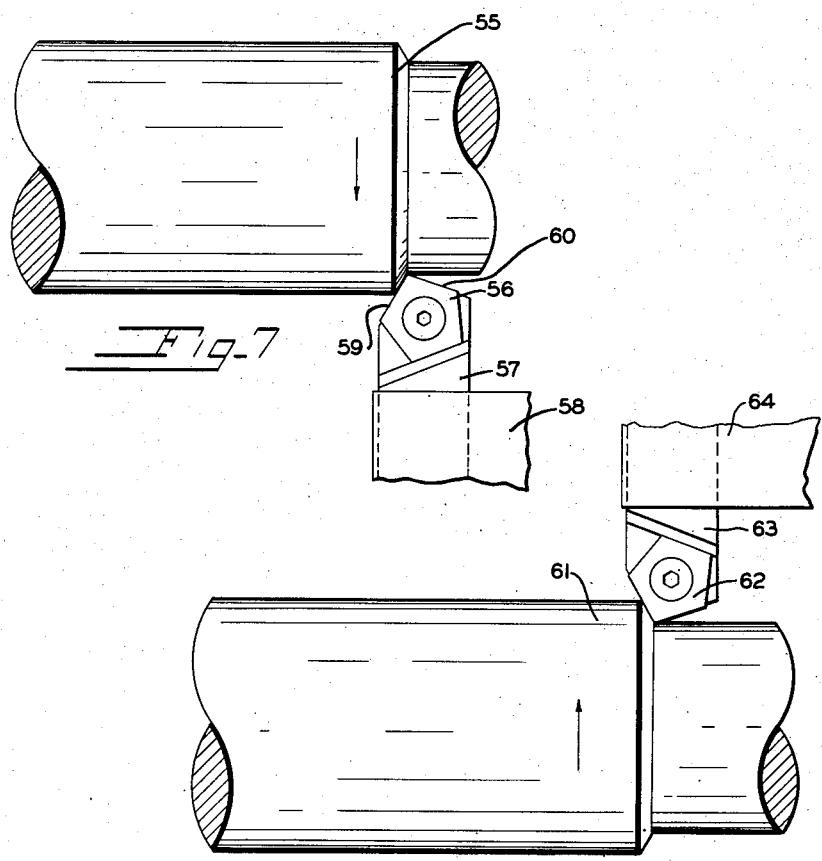
INVENTOR.
PHILIP M. McKENNA
WILBUR L. KENNICOTT
BY
*Clarence B. Desjardins*
THEIR ATTORNEY Patented May 27, 1952

2,598,581

UNITED STATES PATENT OFFICE 2,598,581

CUTTING TOOL

Philip M. McKenna, Greensburg, and Wilbur L. Kennicott, Latrobe, Pa., assignors to Kennametal Inc., Latrobe, Pa., a corporation of Pennsylvania Application September 4, 1948, Serial No. 47,933

7 Claims. (Cl. 29—98)

This invention pertains to a cutting tool, and, more particularly, pertains to a lathe tool comprising a tool shank and a multi-edged cutting element that may be releasably secured to the shank, in any selected one of a plurality of positions, to bring a selected one of the cutting edges to cutting position.

While the novel cutting tool may be made of any suitable material, the preferred materials are a tough steel for the shank to be used in conjunction with a cemented hard carbide cutting element, or bit.

In accordance with an important feature of the invention the cutting portion of the cutting element, or bit, is formed in the shape of a frustum of a right pyramid of polygonal cross section, and preferably of pentagonal cross section. The pentagonal sectioned frustum provides a most serviceable cutting element in that any two adjacent edges bordering the ends of the frustum meet each other at an included angle of 108° which lies within the accepted preferred range of angles which should be formed by a side cutting edge and an end cutting edge of cemented hard carbide turning and boring tools. In the preferred form of the invention the cutting element is screwed or bolted to the shank, and kept from turning by a vertical surface or shoulder on the shank which is of such conformation and position that it accurately directs the cutting element to a selected one of its plurality of positions.

The small end of the frustum rests against a cutting element supporting face of the shank and the cutting edges are those where the large end of the frustum joins the pyramidal faces. By forming the cutting element in the shape of a regular pentagonal right pyramidal frustum, and by providing means whereby the positioning of the cutting element is made by turning the cutting element on an axis coincident with the axis of the pyramidal frustum, the cutting edges may be brought successively to cutting position without changing the effective conformation of the tool as a whole. Moreover, the mode of attachment of the cutting element to the shank permits replacement or readjustment of it with very little effort.

It will become apparent from the disclosure to follow that the novel cutting tool can be arranged for right-hand or for left-hand cutting, and is admirably adapted for turning or boring, with a side cutting lead angle. Various shank surface angles, for rake and clearance, may be used in connection with the cutting element, without departing from the principle of the invention.

Therefore, one of the objects of the invention is to provide a symmetrical cutting element that may be releasably attached to a tool shank in any selected one of a plurality of positions, each position causing a different one of a like plurality of cutting edges to be presented at work position.

Another object of the invention is to provide a cutting tool comprising a tool shank to which is attached a cutting element adjustable so that any one of a like plurality of cutting edges may be brought to working position.

Another object of the invention is to provide a tool shank cutting element shaped like the frustum of a pyramid.

A more specific object of the invention is to provide a lathe tool comprising a tool shank having a conformation thereon, to which shank may be secured a cutting element, in the form of a frustum of a right pyramid, so that the cutting element may be positioned in any one of a plurality of possible positions wherein a pyramidal face of the frustum is in face to face contact with the formation on the shank which prevents the cutting element from turning.

It is to be particularly emphasized that the invention finds its greatest utility in those lathe tools employing, what is known in the trade as, a side-cutting edge angle. The invention is not to be deemed restricted to such construction, however, as it will be apparent that such tools may be used without a lead angle.

With these and other objects in view, which will appear in the description and claims to follow, the invention is described with reference to the drawings in which:

Fig. 1 is a perspective view of a cutting tool embodying the invention in its preferred form.

Fig. 2 is a top plan view of the cutting end of the tool shown in Fig. 1.

Fig. 3 is a sectional view taken on the line 3—3 of Fig. 2.

Fig. 4 is a perspective view of the cutting element of Fig. 1, removed from the shank.

Fig. 5 is a sectional view similar to Fig. 3, but showing a modified arrangement for attaching the cutting element to the shank.

Fig. 6 is a plan view of the cutting end of a left-hand version of the cutting tool shown in Figs. 1–5.

Fig. 7 is a view of a right-hand tool, of the form shown in Figs. 1 to 5, in working position in a turning operation.

Fig. 8 is a view of a left-hand cutting tool, of the form shown in Fig. 6 in working position in a turning operation.

In the drawings, the same reference numbers are applied to the same parts throughout the several views, and the sections are taken on the section lines looking in the direction of the arrows.

Referring to Figs. 1 to 4, there is shown a tool shank 25 provided with a cutting element-receiving face 26, below the top of the shank, and having a side flank surface 27 and an end surface 28, the surfaces 27 and 28 meeting on edge 29 with an included angle of 108° corresponding to the included angle between two sides of a pentagon. Flank surface 27 meets a side surface 30 of the tool shank along edge 31 with an included angle of approximately 150°. This arrangement provides the most desirable position of the pentagonal bit on the end of the shank. Face 26 is sloped downwardly from faces 28, 27 and 30 to give the desired back rake.

Extending from the surface 26, and through the tool shank to bottom surface 32, is a cylindrical hole 33 (Fig. 4) having, at its lower end, a counterbored portion 34, the axis of said counterbored hole being normal to said surface 26.

The cutting element that is shown in Figs. 1–4 has a top surface 35, a bottom surface 36 adapted to rest on face 26 of the tool shank, and a countersunk axial hole 38 (Fig. 4) which accepts a stud, such as screw bolt 39. Surfaces 35 and 36 are, respectively, the large and the small ends of a frustum of a right pentagonal pyramid. The pyramidal surfaces 41, 41 (see Fig. 4) each incline toward the central axis of the frustum at an included angle of between 10° and 15°, preferably, though, at an angle of 12°. The edges between pyramidal faces of the frustum may be slightly rounded.

The rear boundary of the cutting element receiving face 26 is determined by a vertical wall 43 extending upwardly from the face 26 in a direction substantially normal to the top of the shank. To form a stepped shoulder for engaging one of the pyramidal faces of the cutting bit, the vertical wall 43 terminates at a point below the top of the shank 25 to form an abutment edge 44. The vertical wall 43 and the abutment edge 44 extend angularly across the top of the shank to form an angle of approximately 66° with the side face 30 of the tool shank. Extending rearwardly from the abutment edge 44 at the top of the vertical wall 43 is a rearwardly inclined surface 45 extending downwardly from the abutment edge 44 in a plane approximately parallel to the plane of the cutting element supporting surface 26. This surface 45 is sufficiently wide to provide a stepped shoulder for engaging one of the pyramidal sides of the cutting element and thereby prevent turning of the cutting element when it is secured in position on the cutting element receiving surface 26. The surface 45 terminates in a second vertical wall 46 extending upwardly and substantially normal to the top of the shank 25.

The height of the first vertical wall 43 is less than the average height of one of the cutting elements, such as that shown in Fig. 4. Also, the distance that the vertical wall 43 is spaced from the hole 33 is chosen between the distances of the upper and lower edges of the pyramidal faces of the cutting bit from the center hole of the cutting bit. When the cutting element is secured on the shank, the abutment edge 45 will engage that pyramidal side face of the cutting bit which is not joined to either of the cutting edges to be used. The abutment edge 44 will hold two of the cutting sides of the cutting element substantially aligned with the flank surface 27 and the end surface 28 of the shank. This is so because the included angle of 66° between the abutment edge 44 and the side surface 30 so positions the abutment edge that the pentagonal cutting element will be positioned with two of its sides aligned to the flank surface 27 and the end surface 28 because the included angle between the flank surface 27 and the side surface 30 of the shank is approximately 150°. The distances of the flank surface 27 and the end surface 28 from the center hole are approximately equal to the distances of the lower edges of the pyramidal sides from the center hole of the cutting element. Thus, the lower edges of the cutting element coincides with the upper edge of the flank at end surfaces of the shank.

Utilizing a shank having its cutting element receiving end formed as just described, a pentagonal cutting element such as shown in Fig. 4 may be placed on the cutting element receiving surface 26 with its smaller surface 36 resting upon the cutting element receiving surface 26. With one pyramidal face of the cutting element in engagement with the abutment edge 44, two of the pyramidal surfaces of the cutting element will be aligned with the flank surface and end surfaces 27 and 28, respectively. When the stud 39 is then inserted through the hole 38 in the cutting bit 35 and further into the hole 33 in the shank, it may be tightened by having its threaded end 47 engaged by a socket nut 48 arranged in the counterbored portion 34 of the hole 33. Both the head of the stud 39 and the end of the socket nut 48 are provided with hexagonal recesses 49, 49 to receive the end of a hexagonal wrench. By turning the stud 39 and the socket nut 48 in opposite directions, the stud 39 will be drawn downwardly and will draw the cutting bit downwardly against the cutting element receiving surface 26, as well as rearwardly against the abutment edge 44. With the cutting element so arranged on the shank, the point formed by the intersection of those two pyramidal surfaces 41, 41 which are aligned with the flank face 27 and the end face 28 of the shank, and the top surface 35 of the cutting element, may be used to perform a cutting operation. The cutting bit is securely fastened to the tool shank by the stud 39 and prevented from turning relative to the shank by engagement with the abutment edge 44.

A modified form of the invention is shown in Fig. 5 where the formation of the shank 25 is the same as that shown in Figs. 1 and 3 except that the hole 33 is not counterbored at its lower end but is provided with a smaller threaded bore 51, so the stud 39 may have its lower threaded portion 47 threaded directly into the lower end of the hole 33. In all other respects, the construction shown in Fig. 5 is the same as that shown in Fig. 3. Both forms of securing the stud 39 in position have been found satisfactory.

It has been found particularly desirable to have the hole 38 in the cutting bit formed with a countersunk portion 38a to receive a correspondingly shaped head on the upper end of the stud 39. With this construction, the cutting element is very firmly held against the cutting element receiving surface 26.

Fig. 6 shows a left-hand version of the cutting tool of Figs. 1–4, with the cutting element of Figs. 2 and 3 positioned in a left-hand tool shank 25a.

Fig. 7 is a more or less diagrammatic showing of a right-hand tool in use in turning a bar of metal 55 rotating in the direction of the arrow and being engaged by the cutting element 56 held in tool shank 57 clamped in tool holder 58. The 108° angle between cutting edge 59 and cutting edge 60 permits the combination of side cutting edge angles of from 22° to 30° with end cutting edge angles of 4° to 12° which range has been found best for cemented hard carbide tools where the tool is not otherwise conditioned as to cutting edge angles by requirements of special use. Although the pentagonal form of cemented hard carbide cutting element is the best form for use in turning and boring operations, the invention is not to be deemed limited to the pentagonal form as other polygonal forms may be found useful, particularly triangular, square, and hexagonal forms.

Fig. 8 illustrates a left-hand tool used in turning a bar 61, rotating in the direction of the arrow, and being cut by cutting element 62 held in shank 63 supported in tool holder 64.

It is to be understood that the cutting element may be made of materials other than cemented hard carbide substance without departing from the spirit of the invention.

We are aware that the structures herein described are susceptible of considerable variation without departing from the spirit of our invention, and, therefore, we claim our invention broadly as indicated by the appended claims.

Having thus described our invention, what we claim as new and useful and desire to secure by Letters Patent, is:

1. A cutting tool comprising the combination of a tool holder having a shank and a head provided with a seating face, an abutment wall at one edge thereof, and a bore extending from said seating face perpendicular to the plane thereof and inclined to the vertical longitudinally and laterally with respect to the longitudinal axis of the shank, a cutting element of cemented hard carbide composition having the form of a solid with parallel upper and lower faces lying in planes normal to the axis of the cutting element, every section through said element in a plane normal to said axis being symmetrical about said axis and said sections progressively decreasing in area from the upper to the lower face, said cutting element having a hole therethrough in line with said axis and being positioned on said seating face with said lower face in engagement therewith, said hole aligned with said bore and a portion of the side wall engaging said abutment wall, and a fastening device passing through said hole and into said bore for detachably holding said cutting element in cutting position on said head.

2. A cutting tool comprising a tool holder having a shank and a head, the latter having a seating face and a bore extending therefrom perpendicular to the plane of said face, said bore being inclined to the vertical longitudinally of the shank, a cutting element of cemented hard carbide composition in the form of a frustum of a right pyramid having an axial hole therethrough and upper and lower faces lying in planes normal to the axis of said pyramid, said cutting element being positioned on said seating face with its lower face of lesser area in engagement therewith and said axial hole aligned with said bore, and a fastening device passing through the said hole and into the bore in said head for detachably securing the cutting element in cutting position on said head.

3. The cutting tool of claim 2 in which the said bore is inclined to the vertical laterally of the shank.

4. The cutting tool of claim 3 in which the tool holder head has an abutment wall at one edge of said seating face and said cutting element is positioned on said seating face with one side wall thereof in engagement with said abutment wall.

5. A cutting tool comprising the combination of a tool holder having a shank and a head having a seating face and a bore extending therefrom perpendicular to the plane thereof, said bore being inclined to the vertical longitudinally with respect to the longitudinal axis of the shank, a cutting element of cemented hard carbide composition in the form of a frustum of a pentagonal right pyramid having an axial hole therethrough and upper and lower pentagonal faces lying in planes normal to the axis of said pyramid, said cutting element positioned on said seating face with its lower face of lesser area in engagement therewith and said axial hole aligned with said bore, and a fastening device passing through said hole and into said bore for detachably securing said cutting element in cutting position on said head.

6. The cutting tool of claim 5 in which the said bore is inclined to the vertical laterally with respect to the longitudinal axis of the shank.

7. The cutting tool of claim 6 in which the tool holder head is provided with an abutment wall at the rear edge of said seating face and said cutting element is positioned on said seating face with one side wall thereof engaging said abutment wall.

PHILIP M. McKENNA.
WILBUR L. KENNICOTT.

REFERENCES CITED

The following references are of record in the file of this patent:

UNITED STATES PATENTS

| Number | Name | Date |
| --- | --- | --- |
| 1,459,805 | Tasker | June 26, 1923 |
| 1,629,667 | Knipple | May 24, 1927 |
| 1,838,520 | Archer | Dec. 29, 1931 |
| 1,865,148 | Slade | June 28, 1932 |

FOREIGN PATENTS

| Number | Country | Date |
| --- | --- | --- |
| 350,706 | Great Britain | June 18, 1931 |